US010220440B2

(12) United States Patent
Lai et al.

(10) Patent No.: US 10,220,440 B2
(45) Date of Patent: Mar. 5, 2019

(54) METHOD FOR MANUFACTURING A VALVE BODY HAVING ONE OR MORE CORROSION-RESISTANT INTERNAL SURFACES

(71) Applicant: FISHER CONTROLS INTERNATIONAL LLC, Marshalltown, IA (US)

(72) Inventors: Tan K. Lai, Singapore (SG); Chong S. Siang, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 218 days.

(21) Appl. No.: 15/189,783

(22) Filed: Jun. 22, 2016

(65) Prior Publication Data
US 2017/0326633 A1 Nov. 16, 2017

Related U.S. Application Data

(60) Provisional application No. 62/334,211, filed on May 10, 2016.

(51) Int. Cl.
*B22D 19/00* (2006.01)
*B22D 19/16* (2006.01)
(Continued)

(52) U.S. Cl.
CPC .......... *B22D 19/16* (2013.01); *B22C 9/02* (2013.01); *B22C 9/10* (2013.01); *B22C 9/24* (2013.01);
(Continued)

(58) Field of Classification Search
CPC ...... B22D 19/08; B22D 19/085; B22D 19/14; B22D 19/00; B22D 19/0072; B22D 19/16;
(Continued)

(56) References Cited

U.S. PATENT DOCUMENTS 2,066,658 A * 1/1937 Street .............. B22D 19/00
164/9
4,240,492 A * 12/1980 Edwards ........... B22C 7/023
106/38.22
(Continued)

FOREIGN PATENT DOCUMENTS

DE 2658859 A1 6/1978
EP 1815923 A1 8/2007
GB 824403 A 12/1959

OTHER PUBLICATIONS

International Search Report and Written Opinion for PCT/US2017/028600, dated Jul. 19, 2017.

*Primary Examiner* — Jun Yoo
(74) *Attorney, Agent, or Firm* — Marshall, Gerstein & Borun LLP

(57) ABSTRACT

A method of manufacturing a valve body having one or more corrosion-resistant internal surfaces. The method involves performing a casting process, which includes pouring a first material into a mold box, to produce a valve body casting made of the first material. During the casting process, a layer of a second material is formed on one or more internal surfaces of the valve body casting, the second material having a higher corrosion resistance than the first material, by: (1) applying, with an additive manufacturing technique, the second material to one or more external surfaces of a core, and (2) inserting the core into the mold box. A portion of the first material binds to the second material on the one or more external surfaces of the core while the first material is poured into the mold box.

9 Claims, 2 Drawing Sheets

(51) Int. Cl.
  *B33Y 10/00* (2015.01)
  *B33Y 80/00* (2015.01)
  *B22C 9/10* (2006.01)
  *B22C 9/24* (2006.01)
  *F16K 27/00* (2006.01)
  *B22C 9/02* (2006.01)
  *F16K 27/02* (2006.01)
  *C23C 4/00* (2016.01)
  *B22F 3/105* (2006.01)

(52) U.S. Cl.
  CPC ............. *B33Y 10/00* (2014.12); *B33Y 80/00* (2014.12); *C23C 4/00* (2013.01); *F16K 27/00* (2013.01); *F16K 27/0272* (2013.01); *B22F 3/1055* (2013.01)

(58) Field of Classification Search
  CPC ...... B22D 15/00; B22D 25/02; B22D 29/001; F16K 27/0272; B22C 9/10; B22C 9/04; B22C 9/043; B22C 9/24; B22C 9/02; B22C 9/22; B22C 9/108; B22C 7/02; B22C 3/00; F16D 2250/0007; F16D 2250/0015; F16D 2250/0046; Y10T 29/49885; Y10T 29/49982; Y10T 29/49984; Y10T 29/49988; B33Y 10/00; B33Y 80/00
  See application file for complete search history.

(56) References Cited

U.S. PATENT DOCUMENTS

| | | | |
|---|---|---|---|
| 6,344,160 B1* | 2/2002 | Holtzberg | B29C 33/38 264/102 |
| 2004/0238780 A1* | 12/2004 | Gethmann | F16K 1/422 251/359 |
| 2006/0021731 A1* | 2/2006 | Strangman | B22C 9/12 164/138 |
| 2012/0273153 A1* | 11/2012 | Ahmad | B22C 9/106 164/47 |

* cited by examiner

METHOD FOR MANUFACTURING A VALVE BODY HAVING ONE OR MORE CORROSION-RESISTANT INTERNAL SURFACES

FIELD OF THE DISCLOSURE

The present disclosure generally relates to methods of manufacturing valve bodies for use in control devices, and, more particularly, to a method of manufacturing a valve body having one or more corrosion-resistant internal surfaces.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

A control valve typically includes components such as a valve body, a valve trim assembly (e.g., a flow control member, a valve stem, a valve seat), and an actuator assembly configured to operably position the flow control member within the valve body. These components are, however, susceptible to corrosion as process fluid flows through the control valve. Corrosion may, of course, undesirably compromise the characteristics of the control valve, thereby affecting the quality of the end product.

Thus, it is desirable to minimize the corrosion of control valve components, particularly in the context of a valve body, which can be quite large and, as a result, quite costly and cumbersome to repair or replace. As a result, some approaches have been implemented to minimize such undesirable results. One known approach is to manufacture the entire valve body out of a corrosion resistant material; this approach, however, requires a large amount of the corrosion resistant material, which is typically limited in quantity and, thus, quite expensive to obtain. Another known approach is to weld a layer of corrosion resistant material on the internal surfaces of a casted valve body. This approach, however, requires advanced welding equipment and a skilled welder to complete the task. As such, this approach is time intensive and can be quite costly. And, when the valve body has a complex internal profile, welding often leads to imperfections that may affect the characteristics of the control valve.

DETAILED DESCRIPTION

The present disclosure is generally directed to a method of manufacturing a valve body having or including one or more corrosion-resistant internal surfaces. The method involves performing a casting process, using a first material poured into a molding box, to produce a valve body casting made of this first material, and, during this casting process, forming a layer of a second material (that has a higher corrosion resistance than the first material) on one or more internal surfaces of the valve body casting. The layer of the second material is formed by applying, using an additive manufacturing technique, the second material to or on one or more externals surface of a core, and inserting the core into the molding box. While the first material is poured into the molding box, a portion of the first material binds to the second material on the external surface(s) of the core, such that the interior surface(s) of the valve body casting produced by the casting process is (are) made of the second (more corrosion-resistant) material. This method of manufacturing represents an improvement over known approaches for increasing the corrosion resistance of valve bodies, which include, for example, manufacturing the entire valve body out of a corrosion resistant material (which is quite costly) or welding a corrosion resistant material onto the internal surface of the valve body after it has been casted (which is time consuming and complex).

Figure 1:
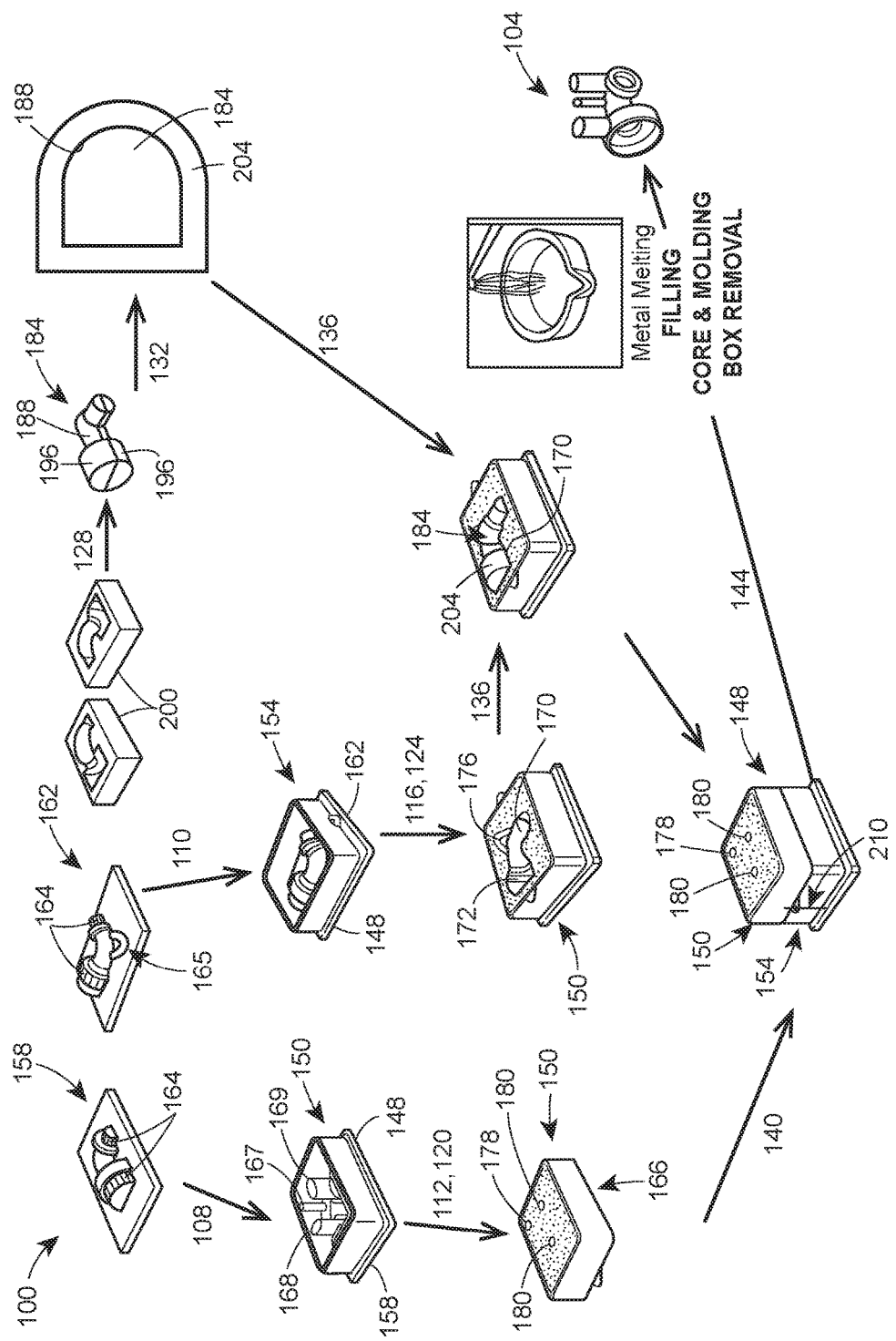
FIG. 1 is a schematic diagram of one example of a process or method constructed in accordance with the teachings of the present disclosure for manufacturing a valve body having one or more corrosion-resistant internal surfaces.

FIG. 1 depicts an example of a method or process 100 according to the teachings of the present disclosure. The method or process 100 depicted in FIG. 1 is a sand casting process that produces a valve body casting 104 for use in a control valve (not pictured). The method or process 100 also utilizes or employs an additive manufacturing technique, while the sand casting process is being performed, to form a layer of a corrosion-resistant material on one or more internal surfaces of the valve body casting 104 ultimately produced by or according to the method or process 100. As a result, the valve body casting 104, when employed in a control valve, can substantially resist corrosion that would otherwise occur as fluid flowing through the control valve contacts or interacts with the internal surfaces of the valve body.

More specifically, the method or process 100 includes the act of providing a molding box 148, commonly referred to as a casting flask, that, at least in this example, has first and second rectangularly-shaped halves or segments 150, 154, though in other examples can include more or less and/or differently shaped and/or sized segments. The molding box 148 also include dowels or pins positioned in the first and/or second segments 150, 154 to create or form a sprue, i.e., a passage through which liquid material is introduced into a mold cavity, and one or more risers, i.e., reservoirs built into the mold cavity to prevent cavities from forming in the casting as a result of shrinking. In the example illustrated in FIG. 1, the molding box includes first, second, and third dowels 167, 168, and 169 arranged in the first segment 150, with the first dowel 167 arranged to form or create the sprue, and the second and third dowels 168, 169 arranged to form or create the risers. In other examples, the first dowel 167 can be arranged in a different position (within the first segment 150 or in the second segment 154), the second and/or third dowels 168, 169 can be arranged differently, and/or more or less dowels can be used to form more or less risers, respectively, if desired.

The first segment 150, which in this example is the upper half or segment, commonly referred to as the cope, receives and is coupled to a first pattern 158 (act 108), while the second segment 154, which in this example is the lower half or segment, commonly referred to as the drag, receives and is coupled to a second pattern 162 (act 110). The first and second patterns 158, 162, which in this example are made of metal but can instead be made of wood, plastic, or any other suitable material, together define the exterior profile (i.e., the exterior surfaces) of the valve body casting 104 to be produced, with the first pattern 158 defining the exterior profile of a first portion of the valve body casting 104 and the second pattern 162 defining the exterior profile of a second portion of the valve body casting 104. As illustrated in FIG. 1, each of the first and second patterns 158, 162 includes a pair of core prints 164, further details of which will be described in greater detail below. The second pattern 162 in this example also includes a tube 165 arranged to form a gate, i.e., a passage through which liquid material can flow from the sprue and into the remainder of the mold cavity, as will also be described in greater detail below.

The method or process 100 next includes the act 112 of packing the first segment 150 with sand and the act 116 of packing the second segment 154 with sand. It will be appreciated that any suitable type of sand can be used, such as, for example, "green sand", dry sand bonded with various materials using an adhesive, and the like. It will also be appreciated that the acts 112 and 116 can be performed at the same time or at different times. In any event, the first and second segments 150, 154 are, at least in this example, packed using a process known as ramming, thereby making the aggregate of the sand and the bonding agent suitable for molding.

At this point, the method or process 100 includes the act 120 of removing the first pattern 158 from the packed first segment 150 and the act 124 of removing the second pattern 162 from the packed second segment 154. The acts 120 and 124 can be performed at the same time or at different times. The removal of the first pattern 158 from the packed first segment 150 creates or forms a first cavity 166 in the sand within the first segment 150, while the removal of the second pattern 162 from the packed second segment 154 creates or forms a second cavity 170 in the sand within the second segment 154. When the method 100 is performed properly, the first cavity 166 should generally correspond to the exterior profile of the first portion of the valve body casting 104 defined by the first pattern. Likewise, when the method 100 is performed properly, the second cavity 170 should generally correspond to the exterior profile of the second portion of the valve body casting 104. The first and second cavities 166, 170 also include impressions 172 formed or created by the core prints 164 arranged on each of the first and second patterns 158, 162. The second cavity 170 also includes a gate 176 formed or created by the tube 165 arranged on the second pattern 162.

After the first pattern 158 is removed from the packed first segment 150, the first, second, and third dowels 167, 168, and 169 are removed from the packed first segment 150. The removal of the first dowel 167 creates or forms a sprue 178, while the removal of the second and third dowels 168, 169 create or form a pair of risers 180.

The method or process 100 also includes the act 128 of producing or providing a core 184 that includes one or more external surfaces 188 that generally define one or more internal surfaces of the valve body casting 104. The core 184 in this example takes the form of a sand core (e.g., a dry-sand core), produced by (i) forming first and second sand core segments 196 using first and second core boxes 200, respectively, made of metal, plastic, and/or other suitable material(s), and (ii) then coupling (e.g., pasting, gluing) the first and second sand core segments 196 together. While the core 184 takes the form of a sand core, the core 184 can, in other examples, take the form of a metal, plastic, or other type of core.

After the core 184 has been obtained, the method or process 100 includes the act 132 of applying (e.g., cladding, coating) a corrosion-resistant material 204 to or on the one or more external surfaces 188 of the core 184 by or using an additive manufacturing technique. The corrosion-resistant material 204, which may, as an example, be a carbon fiber reinforced material, titanium, copper, silver, platinum, or a metal alloy of some type, can be applied to one, some, or all of the external surfaces 188 (as well as portions of or the entirety of one, some, or all of the surfaces 188), depending on the given application. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, and a selective laser sintering ("SLS") process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

It will be appreciated that the act 128 can be performed at the same time as, or in parallel with, one or more of the acts 108, 112, 116, 120, and 124. As an example, the act 128 can be performed at the same time as the act 108 (or portions of the act 108). Alternatively, the act 128 can be performed at a different time than, i.e., before or after, the acts 108, 112, 116, 120, and 124 are performed. Moreover, while the act 132 is performed after the act 128, the act 132 may be performed at the same time as, or in parallel with, one or more of the acts 108, 112, 116, 120, and 124, or can be performed before or after the acts 108, 112, 116, 120, and 124 are performed.

The method or process 100 also includes the act 136 of seating or disposing the core 184 in either the first cavity 166 (formed within the first segment 150) or the second cavity 170 (formed within the second segment 154), as is illustrated in FIG. 1. When the core 184 is seated in the first cavity 166, at least a portion of the core 184 (e.g., one of the core segments 196) will be arranged within the first cavity 166 and supported by the core print impressions 172 therein, while the remainder of the core 184 (e.g., the other of the core segments 196) will extend outward of the first cavity 166. Conversely, when the core 184 is seated in the second cavity 170, at least a portion of the core 184 (e.g., one of the core segments 196) will be arranged within the second cavity 170 and supported by the core print impressions 172 therein, while the remainder of the core 184 (e.g., the other of the core segments 196) will extend outward of the second cavity 170, as is illustrated in FIG. 1.

Following act 136, the method or process 100 includes the act 140 of coupling the first segment 150 of the molding box 148 with the second segment 154 of the molding box 148. The first and second segments 150, 154 can be coupled together in any number of ways, e.g., using closing pins 210. Because in act 136 the core 184 is seated in one of the first and second cavities 166, 170, when the first and second segments 150, 154 of the molding box 148 are coupled together, the core 184 is seated in each of the first and second cavities 166, 170. In turn, a mold cavity (not shown), which generally defines the structure of the valve body casting 104 produced by the method or process 100, is formed between the first and second segments 150, 154 and the core 184. More specifically, the mold cavity is formed between (i) the one or more interior surfaces of each of the first and second segments 150, 154 that define the first and second cavities 166, 170, and (ii) the one or more external surfaces 188 of the core 184, which, by virtue of the additive manufacturing technique, are at least partially formed of the corrosion-resistant material 204. In other words, the mold cavity is surrounded by the interior surfaces that define the first and second cavities 166, 170, but surrounds the one or more external surfaces 188 of the core 184.

The method or process 100 then includes the act 144 of filling the mold cavity with a molten metal material, e.g., carbon steel, stainless steel, or another metal material, suitable for use in a valve body. The molten metal material is introduced into the mold cavity via the sprue 178 and the gate 176. As the molten metal material flows into and through the mold cavity, at least some of the molten metal material (i.e., the molten metal material flowing along the perimeter of the mold cavity) binds or adheres to the corrosion-resistant material 204 on the one or more external surfaces 188 of the core 184.

After the mold cavity has been filled with the molten metal material, and some of the molten metal material binds to the corrosion-resistant material 204, the molten metal material is cooled (or allowed to cool). As the molten metal material cools, the risers 180 help to prevent cavities from forming in the casting as a result of the cooling. After the material has sufficiently cooled, the core 184 and the first and second segments 150, 154 of the molding box are removed (e.g., by knocking them out). This leaves the valve body casting 104, which generally has structure that corresponds to the mold cavity, but advantageously includes a layer of the corrosion-resistant material 204 on some or the entirety of one or more of the internal surfaces of the valve body casting 104.

It will be appreciated that while the method or process 100 is described as a means for producing a valve body casting, the principles of the present disclosure can be applied to other valve components. Moreover, while the method or process 100 utilizes sand casting, the principles of the present disclosure can be applied to or utilized in connection with other casting processes. Finally, it will be appreciated that the acts of the method 100, while described herein in a particular order, can be performed in any number of different orders unless expressly provided otherwise.

Figure 2:
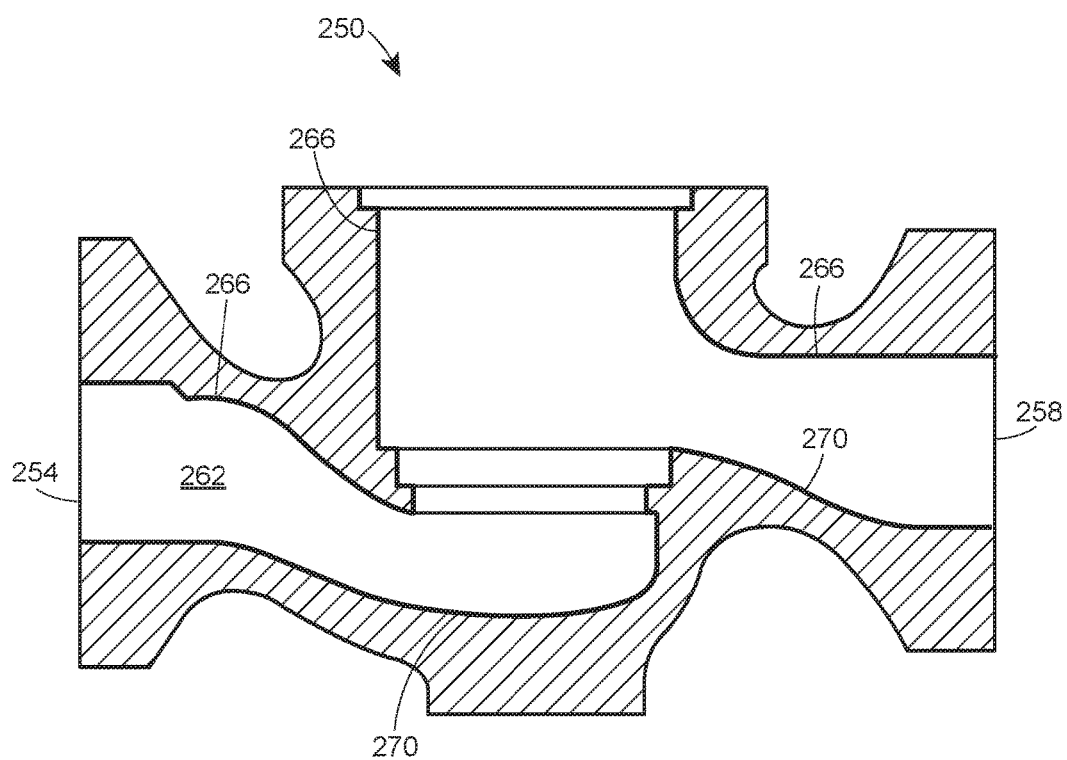
FIG. 2 is a cross-sectional view of one example of a valve body casting produced according to the process or method of FIG. 1, the valve body casting having one or more corrosion-resistant internal surfaces.

FIG. 2 illustrates one example of the valve body casting 104 produced by the method or process 100, in the form of a globe-style valve body casting 250 for use in a sliding-stem type control valve. Alternatively, the method or process 100 can be used to produce an angle-style valve body casting, a rotary valve body casting (for use in a rotary valve), a throttle valve body, or some other type of valve body.

As illustrated in FIG. 2, the valve body casting 250 defines an inlet 254, an outlet 258, and a fluid passageway 262 extending between the inlet 254 and the outlet 258. The valve body casting 250 also includes a plurality of internal surfaces 266 that help to define the fluid passageway 262. Because the valve body casting 250 is produced using or according to the method or process 100 described herein, a layer 270 of the corrosion-resistant material 204 is arranged on the plurality of internal surfaces 266, such that the corrosion-resistant material 204 faces, or is exposed to, process fluid as it flows through the fluid passageway 262. The internal surfaces 266 of the valve body casting 250 are thus substantially protected against corrosion that may otherwise occur over time as a result of process fluid flowing therethrough, thereby lengthening the service life of the valve body casting 250 and minimizing the need for maintenance.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A method of manufacturing a valve body having one or more corrosion-resistant internal surfaces, the method comprising:
   performing a casting process, comprising pouring a first material into a mold box, to produce a valve body casting made of the first material; and
   during the casting process, forming a layer of a carbon fiber reinforced material on one or more internal surfaces of the valve body casting, the carbon fiber reinforced material having a higher corrosion resistance than the first material, wherein forming the layer comprises:
      applying, with an additive manufacturing technique, the carbon fiber reinforced material to one or more external surfaces of a core; and
      inserting the core into the mold box,
      wherein a portion of the first material binds to the carbon fiber reinforced material on the one or more external surfaces of the core while the first material is poured into the mold box.

2. The method of manufacturing according to claim 1, wherein pouring the first material into the mold box comprises pouring carbon steel into the mold box.

3. The method of manufacturing according to claim 1, wherein performing the casting process comprises performing a sand casting process.

4. The method of manufacturing according to claim 3, wherein the core comprises a sand core.

5. The method of manufacturing according to claim 1, wherein the additive manufacturing technique comprises 3D printing.

6. A method of manufacturing a valve body having a corrosion-resistant interior, the method comprising:

providing a molding box comprising a first part and a second part, the first part comprising a first pattern defining a first portion of the valve body, and the second part comprising a second pattern defining a second portion of the valve body;

packing each of the first and second parts of the molding box with sand;

removing the first pattern from the packed first part of the molding box, thereby forming a first cavity in the first part of the molding box;

removing the second pattern from the packed second part of the molding box, thereby forming a second cavity in the second part of the molding box;

providing a core comprising one or more external surfaces defining one or more internal surfaces of the valve body;

applying, by an additive manufacturing technique, a carbon fiber reinforced material to the one or more external surfaces of the core;

disposing the core in one of the first and second cavities;

coupling the first part of the molding box to the second part of the molding box such that the core is seated in each of the first and second cavities, thereby forming a mold cavity surrounding the core; and filling the mold cavity with a molten metal material that at least partially binds to the carbon fiber reinforced material on the one or more external surfaces of the core, thereby forming a casted valve body having a layer of the carbon fiber reinforced material on the one or more internal surfaces.

7. The method of manufacturing according to claim 6, wherein filling the mold cavity with the molten metal material comprises filling the mold cavity with carbon steel.

8. The method of manufacturing according to claim 6, wherein the core comprises a sand core.

9. The method of manufacturing according to claim 6, wherein the additive manufacturing technique comprises 3D printing.

\* \* \* \* \*